US012588972B2

(12) United States Patent
Pimenov et al.

(10) Patent No.: US 12,588,972 B2
(45) Date of Patent: Mar. 31, 2026

(54) DENTAL ANALYSIS WITH MISSING TEETH PREDICTION

(71) Applicant: Align Technology, Inc., San Jose, CA (US)

(72) Inventors: Alexander Pimenov, Moscow (RU);
Rene M. Sterental, Palo Alto, CA
(US); Valery Prokoshev, Moscow
(RU); Irina Ivanova, Moscow (RU);
Dmitry Mednikov, Moscow (RU);
Boris Likhtman, Pushkino (RU);
Alexander Strizhev, Moscow (RU);
Svetlana Makarenkova, Moscow (RU)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/664,208

(22) Filed: May 14, 2024

(65) Prior Publication Data

US 2025/0000615 A1     Jan. 2, 2025

Related U.S. Application Data

(63) Continuation of application No. 16/683,616, filed on Nov. 14, 2019, now Pat. No. 12,023,216.

(Continued)

(51) Int. Cl.
*G06T 17/20* (2006.01)
*A61C 7/00* (2006.01)
(Continued)

(52) U.S. Cl.
CPC ............ *A61C 7/002* (2013.01); *A61C 9/0053* (2013.01); *A61C 19/04* (2013.01); *G06T 7/0012* (2013.01);
(Continued)

(58) Field of Classification Search
CPC ....... A61C 9/0053; A61C 19/04; A61C 7/002; G06T 7/60; G06T 7/0012; G06T 2207/30036; G06T 2200/02; G06T 17/20
(Continued)

(56) References Cited

U.S. PATENT DOCUMENTS

| | | | |
|---|---|---|---|
| 6,227,850 | B1 | 5/2001 | Chishti et al. |
| 6,227,851 | B1 | 5/2001 | Chishti et al. |

(Continued)

OTHER PUBLICATIONS

Bolton WA. Disharmony in tooth size and its relation to the analysis and treatment of malocclusion. The Angle Orthodontist. Jul. 1, 1958;28(3):113-30.*

(Continued)

*Primary Examiner* — Phu K Nguyen
(74) *Attorney, Agent, or Firm* — Shay Glenn LLP

(57) ABSTRACT

Provided herein are methods and apparatuses for analyzing a patient's dental arches in order to generate a treatment plan for the dentition. In particular described herein are methods and apparatuses for analyzing a patient's dental arches when the patient is missing one or more teeth. Methods and apparatuses are provided to properly number the teeth of a patient's arches after a dental scan, including automatically detect missing teeth after a dental scan and estimating the dimensions of the missing teeth. Methods and apparatuses are provided to perform an analysis of the patient's arches that uses the estimated dimensions of the missing teeth. Methods and apparatuses for designing and manufacturing the aligner are also provided.

20 Claims, 9 Drawing Sheets

Related U.S. Application Data

(60) Provisional application No. 62/768,806, filed on Nov. 16, 2018.

(51) Int. Cl.
| | |
|---|---|
| *A61C 9/00* | (2006.01) |
| *A61C 19/04* | (2006.01) |
| *G06T 7/00* | (2017.01) |
| *G06T 7/60* | (2017.01) |

(52) U.S. Cl.
CPC ............... *G06T 7/60* (2013.01); *G06T 17/20* (2013.01); *G06T 2200/24* (2013.01); *G06T 2207/30036* (2013.01)

(58) Field of Classification Search
USPC ........................................................ 345/418
See application file for complete search history.

(56) References Cited

U.S. PATENT DOCUMENTS

| | | |
|---|---|---|
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,147,652 B2 | 10/2021 | Mason et al. |
| 11,151,753 B2 | 10/2021 | Gao et al. |
| 11,154,381 B2 | 10/2021 | Roschin et al. |
| 11,259,896 B2 | 3/2022 | Matov et al. |
| 11,357,598 B2 | 6/2022 | Cramer |
| 11,395,717 B2 | 7/2022 | Yuryev et al. |
| 11,432,908 B2 | 9/2022 | Kopelman et al. |
| 11,464,604 B2 | 10/2022 | Makarenkova et al. |
| 11,478,334 B2 | 10/2022 | Matov et al. |
| 11,484,389 B2 | 11/2022 | Sterental et al. |
| 11,521,732 B2 | 12/2022 | Levin et al. |
| 11,534,272 B2 | 12/2022 | Li et al. |
| 11,553,988 B2 | 1/2023 | Mednikov et al. |
| 11,633,268 B2 | 4/2023 | Moalem et al. |
| 11,642,195 B2 | 5/2023 | Gao et al. |
| 11,651,494 B2 | 5/2023 | Brown et al. |
| 11,654,001 B2 | 5/2023 | Roschin et al. |
| 11,707,344 B2 | 7/2023 | Roschin et al. |
| 11,810,271 B2 | 11/2023 | Shi et al. |
| 11,850,111 B2 | 12/2023 | Derakhshan et al. |
| 11,978,547 B2 | 5/2024 | Levin et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |

(56)                    References Cited

U.S. PATENT DOCUMENTS

| | | | |
|---|---|---|---|
| 2010/0068672 A1 | 3/2010 | Arjomand et al. | |
| 2010/0068676 A1 | 3/2010 | Mason et al. | |
| 2010/0092907 A1 | 4/2010 | Knopp | |
| 2010/0167243 A1 | 7/2010 | Spiridonov et al. | |
| 2011/0189625 A1* | 8/2011 | Hultgren | A61C 19/05 |
| | | | 433/2 |
| 2011/0191075 A1* | 8/2011 | Hultgren | G16H 50/50 |
| | | | 703/2 |
| 2013/0204599 A1 | 8/2013 | Matov et al. | |
| 2017/0273760 A1 | 9/2017 | Morton et al. | |
| 2018/0280118 A1 | 10/2018 | Cramer | |
| 2019/0328488 A1 | 10/2019 | Levin et al. | |
| 2020/0297458 A1 | 9/2020 | Roschin et al. | |
| 2020/0306011 A1 | 10/2020 | Chekhonin et al. | |
| 2021/0134436 A1 | 5/2021 | Meyer et al. | |
| 2021/0343400 A1* | 11/2021 | Inam | G16H 10/60 |
| 2023/0355356 A1* | 11/2023 | Duggan | A61C 13/0004 |
| 2025/0000615 A1* | 1/2025 | Pimenov | A61C 7/002 |

OTHER PUBLICATIONS

Singh B, Sinha N, Mahadevan V, Mall B, Chethan MD, Tamrakar A. Replacement of missing teeth in young adult patients: diagnosis, treatment options, and outcome of care-a review. Journal of Advanced Clinical and Research Insights. Sep. 1, 2015;2(5):221-5.*

Yin-Zhong Duan, et al.; Using the Bolton Index to Guide the Orthodontic Treatment of Individual Mandibular—Tooth Defects; Chinese Journal of Stomatology; vol. 1; (English Abstract); Jan. 25, 2003.

\* cited by examiner 300    303    305

300    303    305

1

DENTAL ANALYSIS WITH MISSING TEETH PREDICTION

CROSS REFERENCE TO RELATED APPLICATIONS

This patent application is a continuation of U.S. patent application Ser. No. 16/683,616, filed Nov. 14, 2019, titled "DENTAL ANALYSIS WITH MISSING TEETH PREDIC-TION," now U.S. Pat. No. 12,023,216, which claims priority to U.S. Provisional Patent Application No. 62/768,806, filed Nov. 16, 2018, titled "DENTAL ANALYSIS WITH MISS-ING TEETH PREDICTION," and is herein incorporated by reference in its entirety.

INCORPORATION BY REFERENCE

All publications and patent applications mentioned in this specification are incorporated herein by reference in their entirety to the same extent as if each individual publication or patent application was specifically and individually indi-cated to be incorporated by reference.

BACKGROUND

Orthodontic or dental treatment plan may improve both the function and aesthetics of the patient's dentition. How-ever, creating such treatment plans may be highly complex. Thus, one or more tools that may assist a user (e.g., a dental practitioner including a dentist, orthodontist, dental techni-cian, etc.) would be very useful. Such tools may help with both the analysis of the patient's existing dentition and/or may provide insights to guide improvements in the dentition and the effect of possible treatments.

In particular, it may be difficult to design a treatment plans when one or more teeth are missing. A person's dentition may include missing or unerupted teeth that do not appear in scans of the person's dental arches. A tooth may be missing for a variety of reasons, including genetics, prior extraction, or loss of the tooth through trauma or activities. An unerupted tooth may include a tooth (such as a permanent tooth of a pediatric patient) that has not erupted into a patient's arch. Missing teeth may be difficult to identify with dental scan technologies. More specifically, many dental scan technologies perform an optical scan of a patient's arches and represent teeth in the arches using three-dimen-sional (3D) dental mesh models. Such 3D dental mesh models may help practitioners visualize teeth arrangements and/or simulate treatment outcomes. Many digital scan technologies use automated tooth segmentation systems (e.g., automated systems that identify and/or number indi-vidual teeth and/or dental features in a 3D dental mesh model). Unfortunately, missing and/or unerupted teeth can be misidentified or missed entirely by automated tooth segmentation systems and/or conventional digital scanning technologies. It would be particularly helpful to provide one or more tools that may aid in analyzing and or guiding treatments that may account for missing teeth.

SUMMARY

Described herein are methods and apparatuses (e.g., devices and systems, including computer-implemented instructions) for assisting a user, such as a dentist, ortho-dontist, or dental technician, in preparing a treatment plan to improve a patient's dentition. Any of these methods and apparatuses may address one or more needs to accurately identify missing teeth in computer models to accurately produce 3D dental mesh models for orthodontic diagnostics and treatment. For example, any of these methods and apparatuses may be configured to automatically determine if a dental structure such as a tooth is missing from a patient's dental arches, and provide an accurate approximation of the dimensions, such as mesiodistal width, of the missing dental structure, and further, use the approximated dimension(s) to estimate and output a metric of the relative sizes of the patient's teeth. The resulting metric may aid the user in interpreting the patient's dentition and/or in designing one or more treatment plans for improving the patient's dentition.

In one aspect, the teeth of a patient's arches can be renumbered properly to account for a gap or large distance between adjacent teeth. If the gap or large distance between adjacent teeth exceeds a gap threshold, the teeth posterior to the gap or threshold can be renumbered appropriately. In another aspect, gaps or large distances between adjacent teeth in a patient's arches can indicate the presence of a missing tooth.

In another aspect, the widths or dimensions of a tooth or adjacent teeth can be evaluated to determine improper teeth numbering in the presence of a missing tooth. The mesial-distal and/or buccal-lingual widths of teeth can be evaluated to determine if a tooth is a molar or a bicuspid, and the teeth can be renumbered accordingly.

In one aspect, an example of a method of forming an orthodontic treatment plan is provided, comprising receiv-ing, in a processor, a scan of a patient's dental arches, determining, in the processor, that at least one tooth is missing in the dental arches, estimating a width of the missing tooth, performing an analysis (e.g., determining a ratio of upper to lower teeth, etc.) using the estimated tooth width, and creating the orthodontic treatment plan to repo-sition at least one tooth of the patient using the analysis of the teeth. In some variations, the analysis may be a Bolton Analysis (e.g., an overall Bolton analysis or an anterior Bolton analysis, etc.) is a tooth analysis used to determine the discrepancy between size of maxillary and mandibular teeth to help determine the optimum interarch relationship. Any of these analyses can be used during orthodontic treatment planning to improve the final tooth position of a patient.

In various aspects, the gap threshold comprises a distance of at least 1 mm, 2 mm, 3 mm, 4 mm, or 5 mm, or at least 3 mm.

In one aspect, the method can further include creating a dental appliance configured to reposition at least one tooth of the patient from the orthodontic treatment plan.

In one aspect, a non-transitory computing device readable medium is provided having instructions stored thereon that are executable by a processor to cause a computing device to receive a dental scan along a teeth curve of a patient's dental arch(es), determine that at least one tooth is missing, estimate a width of the missing tooth, and perform an analysis accounting for the missing teeth.

In one aspect, the gap threshold comprises a distance of at least 1 mm, 2 mm, 3 mm, 4 mm, or 5 mm, or at least 3 mm.

Described herein are methods for providing a metric to a user. The metric may assist a user in designing a treatment plan. For example, a method may include: receiving, in a processor, a scan of a patient's teeth; estimating a mesio-distal width of at least some of the patient's teeth from the scan of the patient's teeth; identifying a missing tooth in the scan of the patient's teeth; estimating a mesiodistal width of the missing tooth; calculating a metric of the relative sizes of the patient's teeth using the estimated mesiodistal width of the missing tooth and the mesiodistal width of at least some of the patient's teeth; and outputting the metric of the relative sizes of the patient's teeth.

For example, a method may include: receiving, in a processor, a scan of a patient's teeth; displaying a model of the patient's teeth based on the scan; and triggering, upon selection by a user of a control to display a metric of relative sizes of the patient's teeth, the processor to perform the steps of: determining a mesiodistal width of each of at least some of the patient's teeth from the scan of the patient's teeth; identifying a missing tooth in the scan of the patient's teeth; estimating a mesiodistal width of the missing tooth; calculating the metric of relative sizes of the patient's teeth using the estimated mesiodistal width of the missing tooth and the mesiodistal width of each of the at least some of the patient's teeth; and displaying the metric of relative sizes of the patient's teeth.

As mentioned, in any of these methods, identifying a missing tooth may include: automatically detecting any gaps between adjacent teeth in the dental arches; determining, in the processor, that at least one tooth is missing in the dental arches if a detected gap exceeds a gap threshold. The gap threshold may comprise a distance of at least 1 mm, 2 mm, 3 mm, 4 mm, or 5 mm.

Calculating the metric may comprises calculating a ratio of the mesiodistal widths of all or some of the patient's mandibular teeth to all or some of the patient's maxillary teeth, wherein the mesiodistal widths of all or some of the maxillary teeth or all some of the of the mandibular teeth includes the estimated mesiodistal width of the missing tooth. For example, calculating the metric may include determining an overall Bolton ratio (e.g., the sum of the lower, mandibular, twelve teeth divided by the sum of the upper, maxillary, twelve teeth times 100), determining an anterior Bolton ratio (e.g., the sum of six lower, mandibular, teeth divided by the sum of six upper, maxillary, teeth times 100), and/or determining some other metric of the sizes of the patient's teeth, such as buccal corridor, etc.

For example, the mesiodistal width of the missing tooth may be estimated based on the mesiodistal width of a contralateral tooth. Alternatively, the mesiodistal width of the missing tooth may be estimated using a Tanaka-Johnston analysis.

Any of these methods may include creating an orthodontic treatment plan to reposition at least one of the patient's teeth using metric of relative sizes of the patient's teeth. For example, the treatment plan may include generating a series of dental aligners in order to adjust or modify the patient's dentition; and/or reducing the size, e.g., by interproximal reduction, of one or more of the patient's teeth. Any of these methods or apparatuses may include creating a dental appliance configured to reposition at least one tooth of the patient from the orthodontic treatment plan.

The metric may be displayed with the digital model of the patient's teeth. For example, outputting the metric of the relative sizes of the patient's teeth may include displaying the metric of the relative sizes of the patient's teeth over a model of the patient's teeth based on the scan. In some variations the model of the patient's teeth may be displayed along with the metric and one or more markers on the teeth, corresponding to the measurement(s) of the mesiodistal widths. The locations of missing teeth may be displayed or indicated. In some variations a listing of the tooth dimensions for all or some of the teeth, including the missing tooth or teeth, may be shown. For example, the mesiodistal widths for all or some of the teeth may be displayed.

Also described herein are non-transitory computing device readable medium having instructions stored thereon that are executable by a processor to cause a computing device to perform any of the methods included herein. For example a non-transitory computing device readable medium having instructions stored thereon that are executable by a processor to cause a computing device to perform the steps of: receiving, in a processor, a scan of a patient's teeth; estimating a mesiodistal width of at least some of the patient's teeth from the scan of the patient's teeth; identifying a missing tooth in the scan of the patient's teeth; estimating a mesiodistal width of the missing tooth; calculating a metric of the relative sizes of the patient's teeth using the estimated mesiodistal width of the missing tooth and the mesiodistal width of at least some of the patient's teeth; and outputting the metric of the relative sizes of the patient's teeth.

In general, the methods described herein may be computer-implemented methods. For example, a computer-implemented method may include: gathering, in a processor, a virtual representation of a patient's dental arches; segmenting the virtual representation of the patient's dental arches into a plurality of individual teeth and assigning anatomical identifiers corresponding to each tooth in the virtual representation of the patient's dental arches; and displaying the virtual representation of a patient's dental arches; and triggering, upon selection by a user of a control to display a metric of relative sizes of the patient's teeth, the processor to perform the steps of: determining a mesiodistal width of each of at least some of the patient's teeth from the scan of the patient's teeth; determining whether the virtual representation of the patient's dental arches contains at least one missing dental structure, the at least one missing dental structure being inconsistent with at least two adjacent teeth in the virtual representation of the patient's dental arches; creating a segmentation of the scanned dental arch(es) by modifying the model segmentation of the model dental arch(es) with an anatomical identifier corresponding to the missing dental structure; estimating a mesiodistal width of the missing dental structure; calculating the metric of relative sizes of the patient's teeth using the estimated mesiodistal width of the missing dental structure and the mesiodistal width of each of the at least some of the teeth in the virtual representation of the patient's dental arches; and displaying the metric of relative sizes of the patient's teeth.

Determining whether the virtual representation of the patient's dental arches contains at least one missing dental structure may comprise: automatically detecting any gaps between adjacent teeth in the dental arches; determining that at least one tooth is missing in the dental arches if a detected gap exceeds a gap threshold. As mentioned above, the gap threshold comprises a distance of at least 1 mm, 2 mm, 3 mm, 4 mm, or 5 mm.

In general, the virtual representation of a patient's dental arches may be gathered from one or more of: an optical scan, an intraoral scan, and an image capture of physical impressions of the patient.

For example, a system may include: one or more processors; a memory coupled to the one or more processors, the memory configured to store computer-program instructions that, when executed by the processor, cause the processor to execute a computer-implemented method comprising: receiving, in a processor, a scan of a patient's teeth; displaying a model of the patient's teeth based on the scan; and triggering, upon selection by a user of a control to display a metric of relative sizes of the patient's teeth, the processor to perform the steps of: determining a mesiodistal width of each of at least some of the patient's teeth from the scan of the patient's teeth; identifying a missing tooth in the scan of the patient's teeth; estimating a mesiodistal width of the missing tooth; calculating the metric of relative sizes of the patient's teeth using the estimated mesiodistal width of the missing tooth and the mesiodistal width of each of the at least some of the patient's teeth; and displaying the metric of relative sizes of the patient's teeth.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
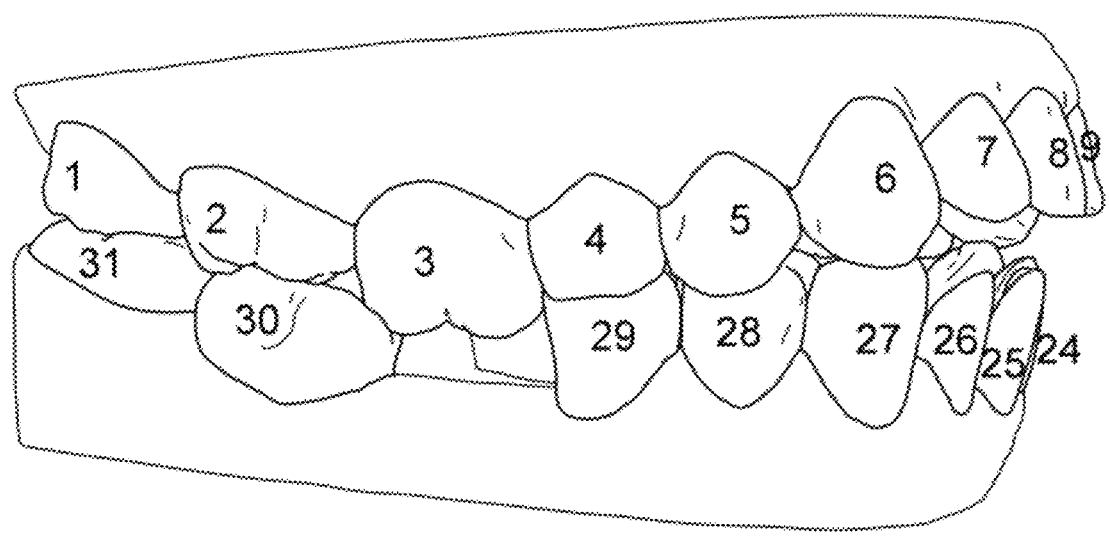
FIGS. 1A-1B illustrate a 3D model of a patient's teeth improperly and properly numbered, respectively, due to a missing tooth.

The present disclosure is related to systems, methods, computing device readable media, and devices for identifying missing teeth during automated teeth segmentation and applying an analysis accounting for the missing tooth or teeth in orthodontic applications. The systems, methods, and computing devices herein solve technical problems related to design and segmentation of models of a patient's arches, including identifying missing teeth and performing an analysis while accounting for the missing teeth.

The planning and fabrication of such dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No.

5,975,893 are commercially available from Align Technology, Inc., Santa Clara, Calif., under the tradename, Invisalign System.

Throughout the body of the Description of Embodiments, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances."

The methods described below can be integrated into an orthodontic treatment plan when a patient has been identified as having one or more missing teeth. Identifying that a patient's arch contains missing teeth may be made automatically (e.g., using a computing device). For example, identification can be performed by a computing system automatically by evaluating data (such as a scan or dental impression) of the patient's teeth or arches.

As described herein, an intraoral scanner may image a patient's dental arches and generate a virtual three-dimensional model of that dental arches. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The intraoral scanner can automatically generate a 3D model of the patient's teeth, which can be used for treatment planning.

Missing and/or unerupted teeth are difficult to identify with digital scan technologies, particularly those technologies that use automated tooth segmentation systems. An automated tooth segmentation system, as used herein, may include a system that uses automated agents to identify and/or number individual teeth and/or dental features of virtual representations of teeth, such as teeth represented in a 3D dental mesh model resulting from a digital scan.

A basic tooth segmentation process that scans along the teeth curve is likely to fail to identify missing or unerupted teeth, and is also likely to improperly number the identified teeth. since all teeth are typically numbered sequentially.

The present disclosure presents one or more novel processes for identifying and/or numbering all teeth, including missing or unerupted teeth, during a tooth segmentation process. Some implementations herein may solve technical problems related to optimizing and/or increasing the accuracy of digital dental scanning technologies. The tooth segmentation processes described herein advantageously may: 1) properly renumber teeth while accounting for missing or unerupted teeth, 2) perform an analysis of a patient's detention while accounting for missing teeth.

Figure 1B:
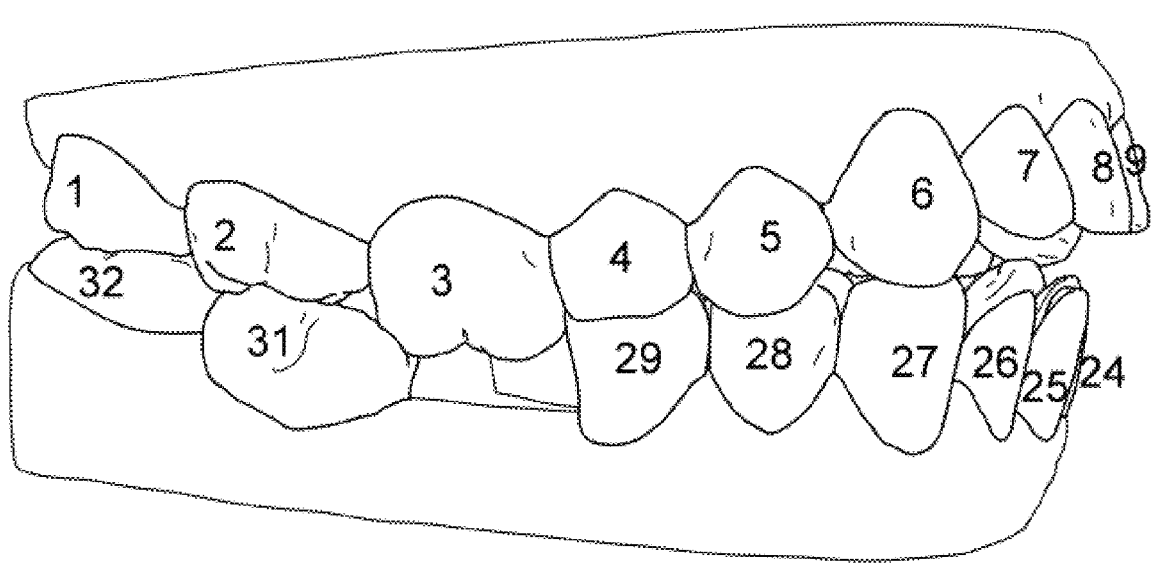

FIG. 1A illustrates teeth numeration from a basic tooth segmentation process without accounting for gaps or missing teeth. As can be seen in FIG. 1A, teeth 32 and 31 are improperly numbered as teeth 31 and 30, respectively, due to missing tooth 30. The improper numbering is a result of numbering the teeth sequentially from the anterior to posterior teeth without accounting for gaps or missing teeth. Thus, in FIG. 1A, a simple numbering sequence on the lower jaw may start with incisor 25 and increase sequentially towards the molars. Since tooth 30 (first molar) is missing in FIG. 1A, the simple numbering sequence will improperly number tooth 31 (second molar) as tooth 30, and will improperly number tooth 32 (third molar) as tooth 31. In contrast, FIG. 1B shows teeth 32 and 31 properly numbered.

Figure 2A:
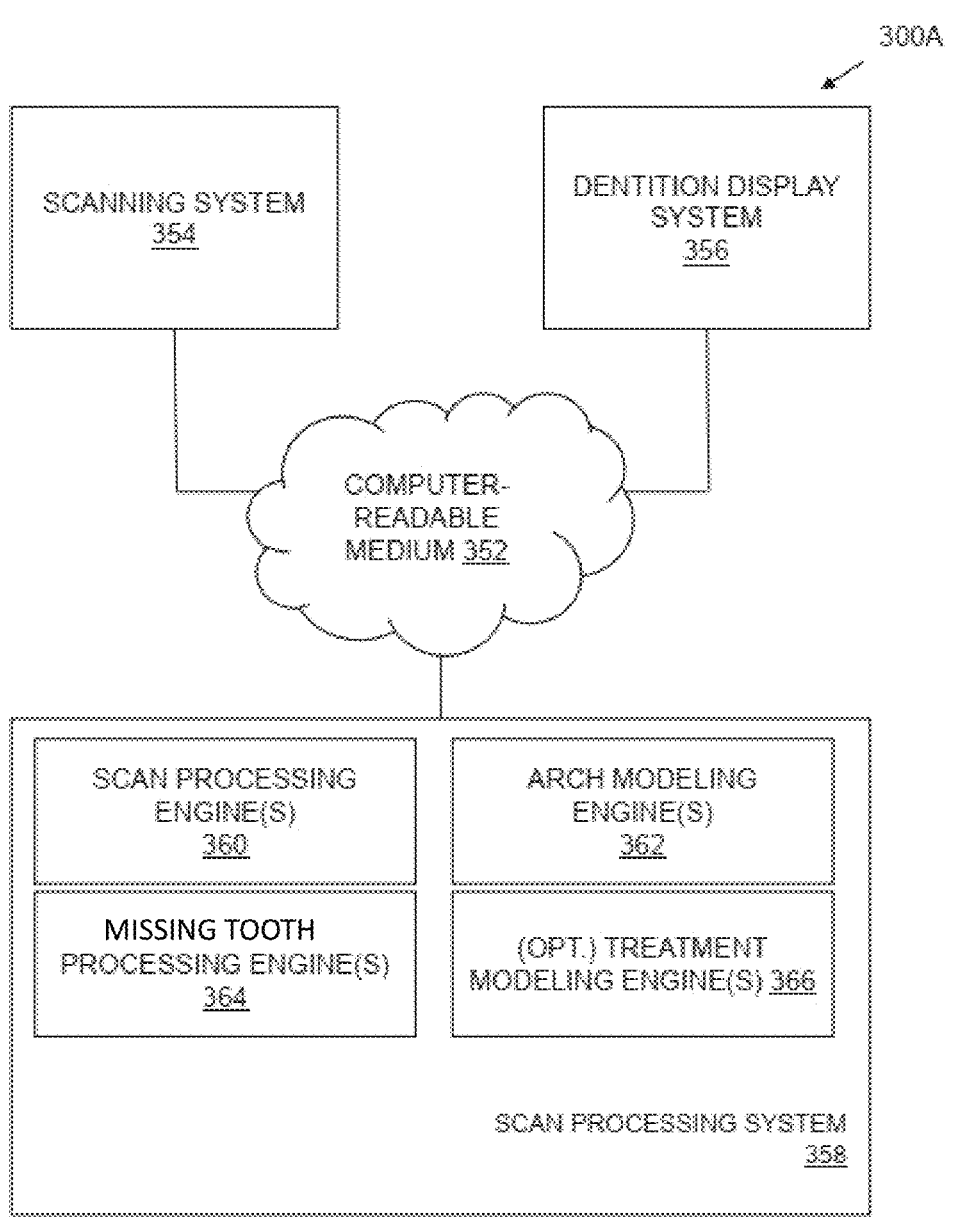
FIG. 2A is a diagram showing an example of a computing environment configured to digitally scan a dental arch with abnormal teeth therein.

FIG. 2A is a diagram showing an example of a computing environment 300A configured to digitally scan a patient's dental arches with missing teeth therein. The environment 300A includes a computer-readable medium 352, a scanning system 354, a dentition display system 356, and a scan processing system 358. One or more of the modules in the computing environment 300A may be coupled to one another or to modules not explicitly shown.

The computer-readable medium 352 and other computer readable media discussed in this paper are intended to represent a variety of potentially applicable technologies. For example, the computer-readable medium 352 can be used to form a network or part of a network. Where two components are co-located on a device, the computer-readable medium 352 can include a bus or other data conduit or plane. Where a first component is co-located on one device and a second component is located on a different device, the computer-readable medium 352 can include a wireless or wired back-end network or LAN. The computer-readable medium 352 can also encompass a relevant portion of a WAN or other network, if applicable.

The scanning system 354 may include a computer system configured to capture still images, video, and/or other media of a patient's dental arches. The scanning system 354 may include memory, one or more processors, and sensors to detect contours on a patient's dental arches. The scanning system 354 may be implemented as a camera, an intraoral scanner, an x-ray device, an infrared device, etc. The scanning system 354 may include a system configured to provide a virtual representation of a mold of patient's dental arches. A "dental arch," as used herein, may include at least a portion of a patient's dentition formed by the patient's maxillary or mandibular teeth, when viewed from an occlusal perspective. A dental arch may include one or more maxillary or mandibular teeth of a patient, such as all teeth on the maxilla or mandible or a patient. One or both dental arches may be included in any of the methods described herein, unless the context make it clear otherwise. The scanning system 354 may be used as part of an orthodontic treatment plan. In some implementations, the scanning system 354 is configured to capture a patient's dental arches at a beginning stage, an intermediate stage, etc. of an orthodontic treatment plan.

The dentition display system 356 may include a computer system configured to display at least a portion of a dentition of a patient. The dentition display system 356 may include memory, one or more processors, and a display device to display the patient's dentition. The dentition display system 356 may be implemented as part of a computer system, a display of a dedicated intraoral scanner, etc. In some implementations, the dentition display system 356 facilitates display of a patient's dentition using scans that are taken at an earlier date and/or at a remote location. It is noted the dentition display system 356 may facilitate display of scans taken contemporaneously and/or locally to it as well. As noted herein, the dentition display system 356 may be configured to display the intended or actual results of an orthodontic treatment plan applied to a dental arch scanned by the scanning system 354. The results may include 3D virtual representations of the dental arches, 2D images or renditions of the dental arches, etc.

The scan processing system 358 may include a computer system configured to process scans of a patient's dentition taken by the scanning system 354. As noted herein, the scan processing system 358 may be configured to process scans of missing teeth in a dental arch. "Missing teeth," as used in this context, may refer to teeth that do not show up in a scan of a dental arch due to a variety of factors. Missing teeth may include teeth that are missing due to various reason (genetics, trauma, removal, etc.), unerupted teeth, etc. The scan processing system 358 may include scan processing engine(s) 360, arch modeling engine(s) 362, missing tooth processing engine(s) 364, and optional treatment modeling engine(s) 366. One or more of the modules of the scan processing system 358 may be coupled to each other or to modules not shown.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The scan processing engine(s) 360 may implement one or more automated agents configured to interface with the scanning system 354. The scan processing engine(s) 360 may include graphics engines to gather scans of a dental arch. In some implementations, the scan processing engine(s) 360 format raw data from a scan of a dental arch into a 3D dental mesh models of the dental arch. The 3D dental mesh models may comprise polyhedral objects that depict teeth and/or other elements of the dental arch in a format that can be rendered on the dentition display system 356. The scan processing engine(s) 360 may provide 3D dental mesh models and/or other data to other modules of the scan processing system 358.

The arch modeling engine(s) 362 may implement one or more automated agents configured to model 3D dental mesh models into virtual representations of dental arches. In some implementations, the arch modeling engine(s) 362 assign physical and/or geometrical properties to a 3D dental mesh models that are related to physical/geometrical properties of dental arches. As an example, the arch modeling engine(s) 362 may implement one or more automated segmentation agents that assign tooth identifiers (e.g., universal tooth numbers) to specific portions of a 3D dental mesh model. The arch modeling engine(s) 362 may further evaluate curves and/or other geometric properties of a 3D dental mesh model to determine whether a scan corresponds to a maxilla, a mandible, or other portion of a patient's dentition.

The missing tooth processing engine(s) 364 may implement one or more automated agents configured to identify and/or accommodate missing dental structures. A "missing dental structure," as used herein, may include any dental structure (e.g., tooth or combination of teeth) that is inconsistent with the geometry of at least two teeth in a model dental arch. A missing dental structure may include teeth that are missing due to various reason (genetics, trauma, removal, etc.), unerupted teeth, etc. On a dental scan, missing or unerupted teeth may show up as two normally non-adjacent teeth being adjacent to each other. In some implementations, the missing tooth processing engine(s) 364 are configured to analyze a patient's dental arches for gaps, e.g., to determine whether a patient's dental arch contains significant gaps (e.g., gaps that exceed a specified gap threshold) between teeth. The missing tooth processing engine(s) 364 may further be configured to evaluate whether adjacent teeth in a patient's dental arch correspond to similar adjacent teeth in an ideal or model dental arch or whether the adjacent teeth in a patient's dental arch correspond to teeth that are typically separated by one or more other teeth in the ideal or model dental arch. In some embodiments, the missing tooth processing engine(s) is configured to identify erupting teeth and predict the tooth type of the erupting teeth. For example, the missing tooth processing engine(s) 364 may extract dental features from a target tooth and predict a tooth state including a tooth type and/or eruption status using the extracted features. Additional details on a method of detecting an eruption status of a target tooth are described in App. No. PCT/US2018/037849, titled "Automatic Detection of Tooth Type and Eruption Status", filed Jun. 15, 2018, which is incorporated herein by reference. In various implementations, the missing tooth processing engine(s) 364 provide the arch modeling engine(s) 362 and/or other modules instructions to "re-segment," such as renumber the teeth in a scan of a dental arch in order to accommodate missing teeth in that dental arch. An example of the missing tooth processing engine(s) 364 is shown as the missing tooth processing engine(s) 364b, in FIG. 2B.

The optional treatment modeling engine(s) 366 may be configured to store orthodontic treatment plans and/or the results of orthodontic treatment plans. The optional treatment modeling engine(s) 366 may provide the results of orthodontic treatment plans on 3D dental mesh model. The optional treatment modeling engine(s) 366 may model the results of application of orthodontic aligners to the patient's dental arch over the course of an orthodontic treatment plan.

Figure 2B:
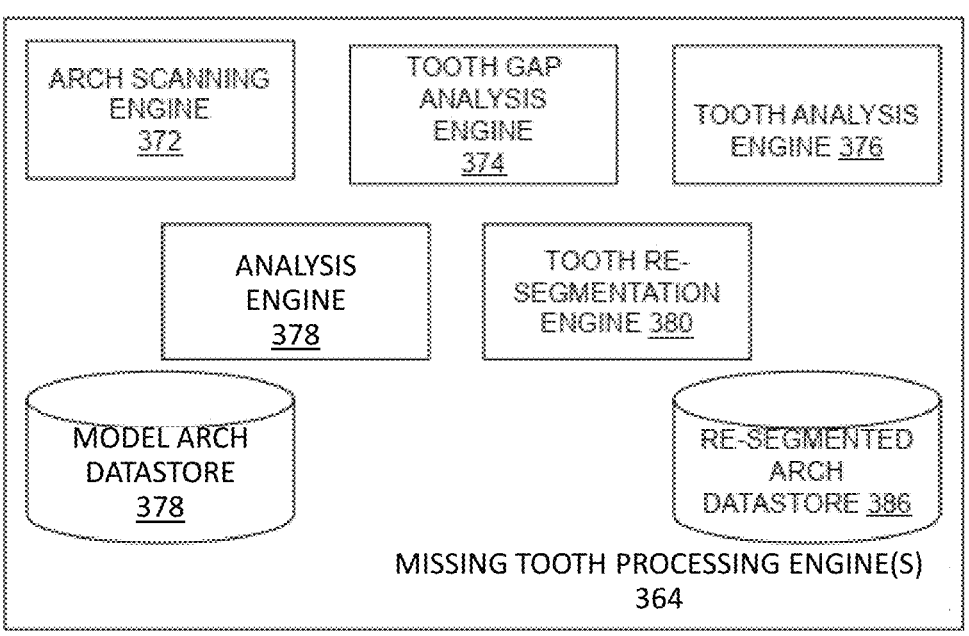
FIG. 2B is a diagram showing an example of missing tooth processing engine(s).

FIG. 2B is a diagram showing an example of the missing tooth processing engine(s) 364. The missing tooth processing engine(s) 364 may include an arch scanning engine 372, a tooth gap analysis engine 374, a tooth analysis engine 376, an analysis engine 378, a tooth re-segmentation engine 380, a model arch datastore 382, and a re-segmented arch datastore 386. One or more of the modules of the abnormal tooth processing engine(s) 364 may be coupled to each other or to modules not shown.

The arch scanning engine 372 may implement one or more automated agents configured to scan a dental arch for segmentation data. "Segmentation data," as used herein, may include positions, geometrical properties (contours, etc.), and/or other data that can form the basis of segmenting a dental arch. The arch scanning engine 372 may implement automated agents to number teeth in a dental arch. In some implementations, the arch scanning engine 372 begins numbering teeth at anterior portion (e.g., the midline) of a dental arch and continues numbering through posterior portion(s) of the dental arch.

The tooth gap analysis engine 374 may implement one or more automated agents configured to analyze a dental arch for the presence or absence of spatial gaps. The tooth gap analysis engine 374 may determine whether the space between two adjacent teeth in a dental arch meets or exceeds a gap threshold. A "gap threshold," as used herein, may comprise a minimum distance between two teeth from which to infer the existence of an abnormal tooth. A gap threshold may comprise a general threshold for all patients, or may comprise one or more specific thresholds that depend on age or other attributes of patients. The tooth gap analysis engine 374 may be further configured receive information from other modules or engines regarding erupting teeth in the dental arch, or alternatively, may be configured to detect and identify erupting teeth in a dental arch that contains significant spatial gaps, abnormal adjacent teeth, or other attributes that indicate the presence of an erupting tooth. In various implementations, the tooth gap analysis engine 374 provides other modules, (analysis engine 378, the tooth re-segmentation engine 380, etc.) with specific areas of a dental arch that contain significant spatial gaps, such as those that meet or exceed one or more gap thresholds.

The tooth analysis engine 376 may implement one or more automated agents configured to determine tooth dimensions of missing teeth in a dental arch. The tooth analysis engine 376 may gather attributes (identifiers, dimensions, etc.) of teeth, e.g., buccal-lingual width and/or mesial-distal width, of adjacent teeth and/or contralateral teeth to the missing teeth to determine or estimate the width of the missing tooth. The tooth analysis engine 376 may evaluate and/or compare these attributes with attributes of ideal or model teeth in an ideal or model dental arch. The attributes of ideal or model teeth in an ideal or model dental arch can be accessed from, for example, model arch datastore 378. The tooth analysis engine 376 may provide other modules (analysis engine 378, the tooth re-segmentation engine 380, etc.) with specific areas of a dental arch that contain teeth that do not match similar teeth in an ideal or model dental arch.

The tooth analysis engine 376 can be configured to determine or estimate the width of a missing tooth based on the type of tooth that is missing. For example, if the missing tooth is an incisor, then the missing tooth width can be estimated based on the width of the contralateral incisor. If no contralateral incisor is present (i.e., the contralateral incisor is also missing), then statistical proportions can be used to determine the missing tooth width. For example, a database of patient tooth widths can be used to make generalizations about the widths of respective teeth. In this example, the width of a missing central incisor can be estimated based on the width of the lateral incisor which typically has a different width than the central incisor by a specific amount. In one specific example, it has been determined using patient data that if a central incisor has a width of Y mm, then a lateral incisor has a width of approximately Y−1.85 mm for the upper arch and Y+0.5 mm for the lower arch. In another example, it has been determined using patient data that if a central incisor has a width of Y mm, a canine has a width of approximately Y+2.4 mm for the upper arch and Y+1.5 mm for the lower arch.

In another example, if the missing tooth is a canine, then the missing tooth width can be estimated based on the width of the contralateral canine. If no contralateral canine is present (i.e., the contralateral canine is also missing), then the width can be estimated using Tanaka-Johnston proportions. For example, the width of a mandibular canine can be estimated using the following relationship:

$$\text{Width of mandibular canine in one quadrant} = \tag{1}$$
$$\frac{(\text{Width of four lower incisors})}{2} + 10.5 -$$
$$(\text{Width of mandibular premolars in same quadrant})$$

Similarly, the width of a maxillary canine can be estimated using the following relationship:

$$\text{Width of maxillary canine in one quadrant} = \tag{2}$$
$$\frac{(\text{Width of four lower incisors})}{2} + 11 -$$
$$(\text{Width of maxillary premolars in same quadrant})$$

In another example, if the missing tooth is a premolar, then the missing tooth width can be estimated using Tanaka-Johnston proportions. For example, the width of a mandibular premolar can be estimated using the following relationship:

$$\text{Width of mandibular premolar in one quadrant} = \tag{3}$$
$$\frac{(\text{Width of four lower incisors})}{2} + 10.5 -$$
$$(\text{Width of mandibular canine in same quadrant}) -$$
$$(\text{Width of neighbor premolar in the quadrant})$$

Similarly, the width of a maxillary premolar can be estimated using the following relationship:

$$\text{Width of maxillary premolar in one quadrant} = \tag{4}$$
$$\frac{(\text{Width of four lower incisors})}{2} + 11 -$$
$$(\text{Width of maxillary canine in same quadrant}) -$$
$$(\text{Width of neighbor premolar in this quadrant})$$

The analysis engine 378 may implement one or more automated agents configured to perform an analysis of the patient's teeth to provide one or more metrics on the patient's teeth. For example the analysis may provide a metric (e.g., a ratio) of the relative sizes of the patient's teeth. In some variation these relative sizes may be used to determine a discrepancy between the size of the maxillary and mandibular teeth of the patient, e.g., to determine an overall or anterior Bolton ratio. When the patient has one or more missing teeth, the analysis engine 378 can use the estimated width(s) from the tooth analysis engine 376, as described above. The analysis engine 378 may provide an analysis ratio (including but not limited to a ratio of upper to lower teeth, including predicted or estimated measurements for any missing teeth) to other modules, such as the tooth re-segmentation engine 380.

The tooth re-segmentation engine 380 may implement one or more automated agents configured to re-segment a dental arch in light of missing teeth that were identified in a dental arch. In some implementations, the tooth re-segmentation engine 380 re-segments a dental arch starting with the anterior midline. The tooth re-segmentation engine 380 may continue re-segmentation by moving segments toward the posterior of the dental arch. The tooth re-segmentation engine 380 may separately segment sagittal portions. The tooth re-segmentation engine 380 may skip identifiers/numbers/segments corresponding to missing teeth.

The model arch datastore 382 may be configured to store data related to model dental arches, including model dental arches that have been segmented. The model dental arch data may comprise segments of ideal or model dental arches, including tooth identifiers of teeth normally present in an ideal/model dental arch. The model arch datastore 382 may further store data related to tooth widths of the various tooth types of a plurality of patients, including incisor widths, canine widths, and premolar widths. The re-segmented arch datastore 386 may be configured to store data related to re-segmented dental arches. The re-segmented dental arch data may comprise segments of dental arches having missing teeth; the re-segmented dental arch data may have been stored in the re-segmented arch datastore 386 by the tooth re-segmentation engine 380.

Figure 3A:
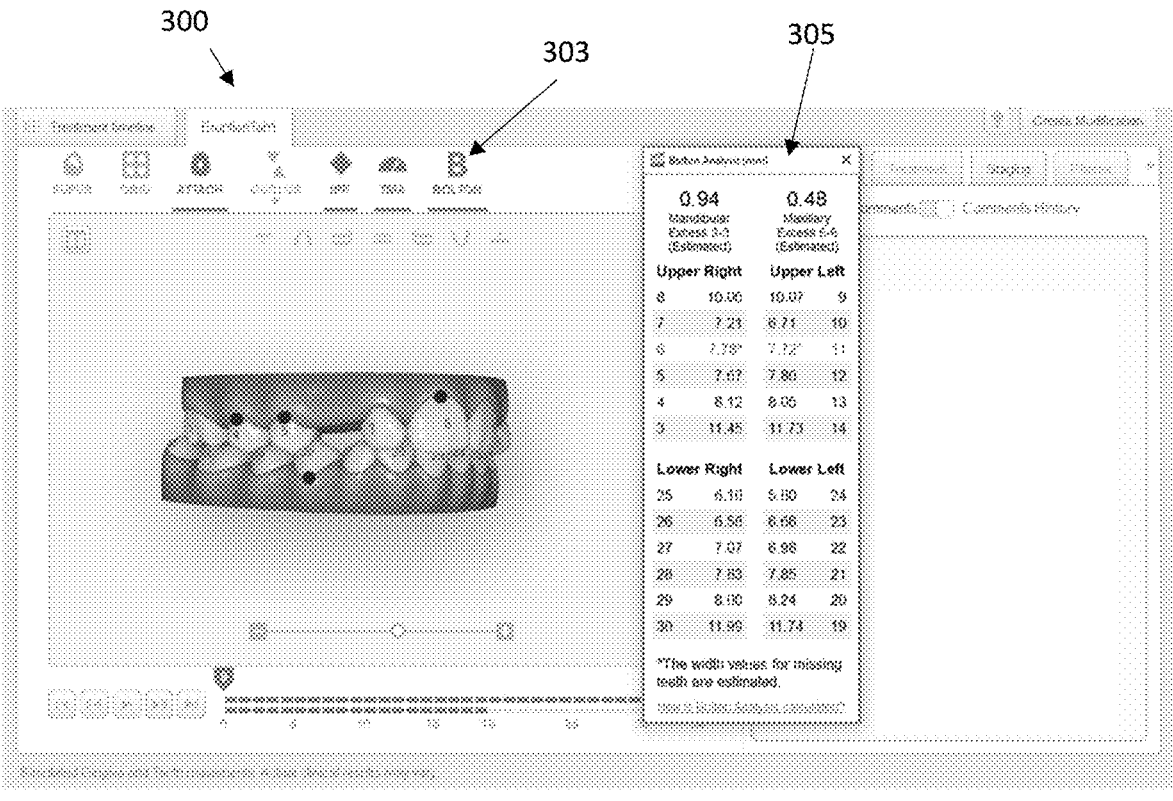
FIG. 3A is an example of a graphical user interface that displays a 3D model of a patient's teeth and includes an analysis of the relative width ratios (e.g., an overall and an anterior Bolton analysis) that accounts for a missing tooth.

FIG. 3A illustrates one example of a graphical user interface 300 (which may be part of an apparatus or method as described herein) that displays a 3D model of a patient's teeth (e.g., upper and lower arches) that has been segmented to account for missing tooth number 6. The graphical user interface further displays the width (e.g., mesiodistal width) of each tooth, including an estimated width of tooth number 6 based on the techniques described above. In this example, the display (user interface) includes a control, shown as a button 303 that the user may select to request calculation and display of a metric, such as the Bolton analysis (e.g., Bolton ratio). In FIG. 3A, the control is configured to trigger the calculation of an analysis based on the mesiodistal widths of the teeth, including any missing teeth. Thus, in FIG. 3A, selection of the control ("Bolton button") results in the processor calculating an overall Bolton ratio, based on the mesiodistal width for twelve of the upper teeth, including the missing tooth 6 and the twelve bottom teeth, as well as the anterior Bolton ratio, based on the mesiodistal width of the six anterior, upper, teeth and six anterior, lower, teeth. Furthermore, the graphical user interface displays the resulting metrics (from the Bolton analysis) including the tooth widths and estimated tooth width for missing tooth number 6 in a display 305. The analysis display shows the individual tooth measurements (e.g., mesiodistal widths) as well as the estimated ratios of these widths.

Figure 3B:
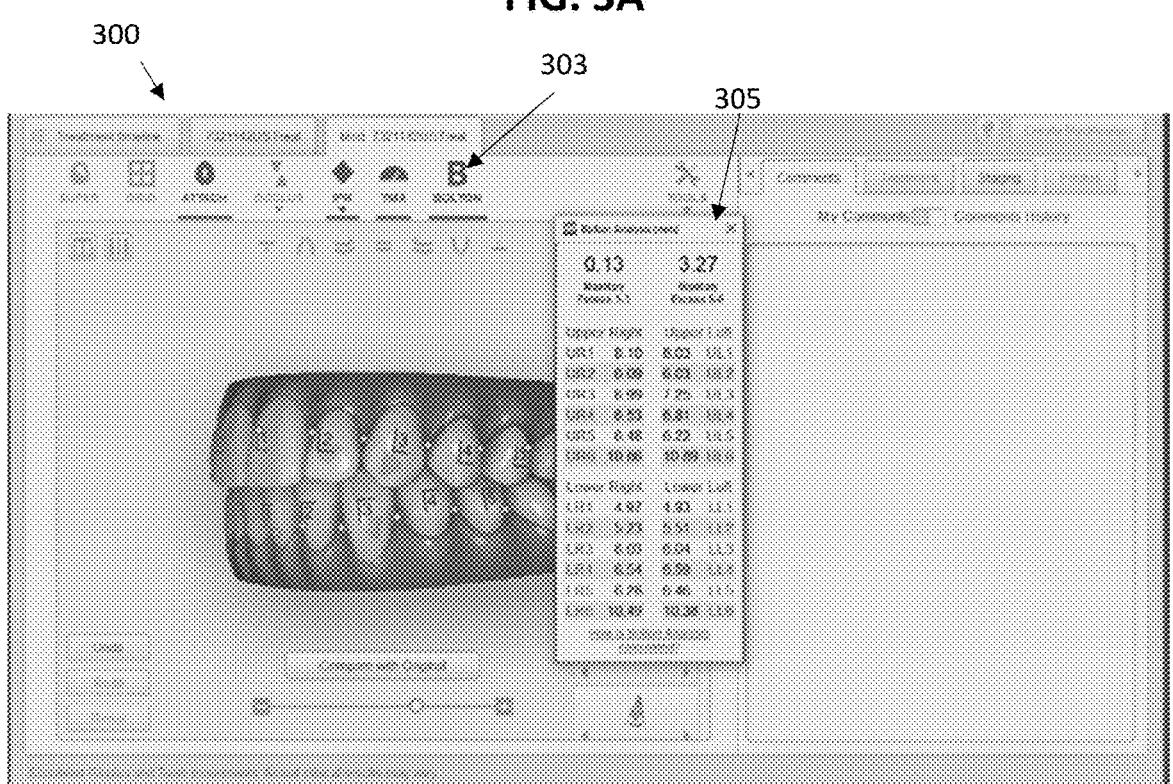
FIG. 3B is an example of a graphical user interface that displays a 3D model of a patient's teeth and includes an analysis of the relative width ratios (e.g., an overall and an anterior Bolton analysis).

FIG. 3B is an example in which no gap is detected. As described above in FIG. 3A, the user interface shows a 3D model (image) of the patient's teeth. This model may be manipulated by the user, e.g., using one or more controls, including controls for rotating, zooming, etc. The same control (button 303) may be selected, and the analysis performed and the resulting metric(s) displayed, as shown. Thus, any of the methods and apparatuses described herein may automatically detect one or more missing dental structures (e.g., teeth) and may estimate or approximate the dimensions of each. If not missing teeth are detected, the methods and apparatuses may perform the analysis with the measured/estimated dimensions, such as mesiodistal width.

Figure 4:
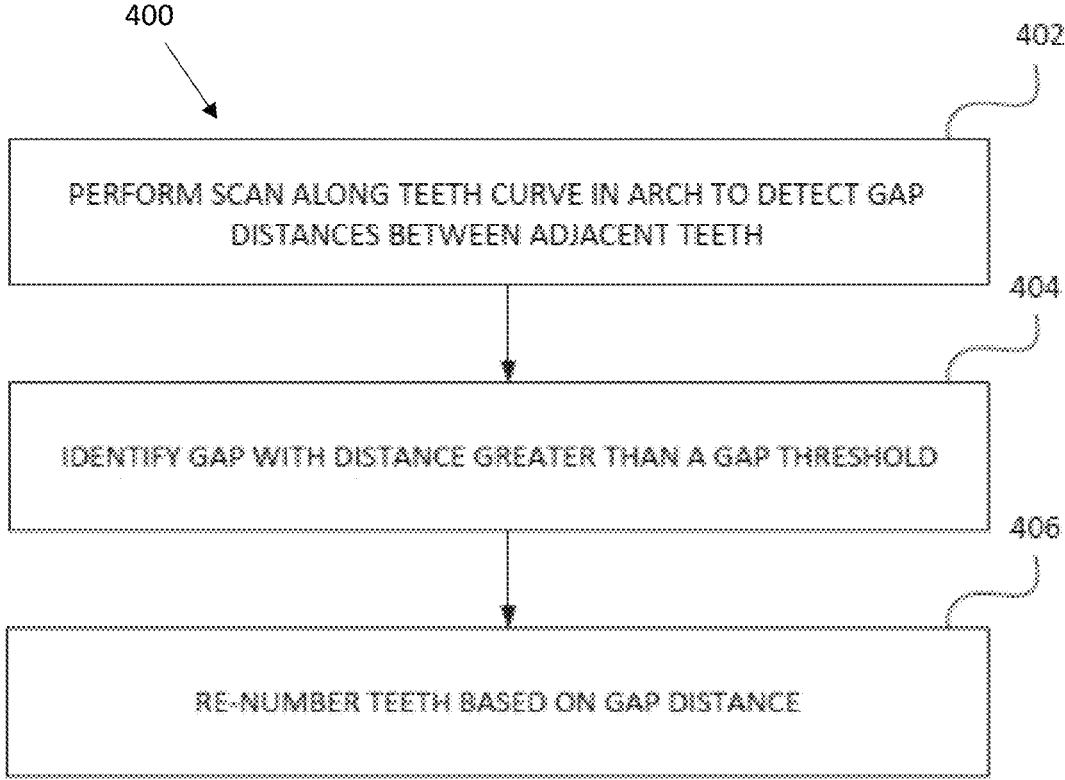
FIG. 4 illustrates a flowchart that describes a tooth renumbering process for properly numbering teeth in the event of a missing tooth.

FIG. 4 illustrates a flowchart 400 that describes a tooth renumbering process for properly numbering teeth in the event of a missing tooth. The flowchart describes steps that can properly renumber the tooth positioned posterior to a gap in the arch. Referring to operation 402 of flowchart 400 the process includes performing a basic scan along a teeth curve of to detect the distances or gaps between adjacent teeth in the patient's arch. This scan can be performed, for example, with an intraoral scanner.

Next, at operation 404, the process includes identifying gaps having distances between adjacent teeth that are greater than a gap threshold. For example, a gap threshold can be defined as a gap having a distance between adjacent teeth that is greater than 3 mm. It should be understood that additional gap tooth thresholds can be used, including distances between adjacent teeth greater than 2 mm, 3.5 mm, 4 mm, etc. A distance that exceeds the gap threshold can be indicative of a missing tooth. In one specific example, a distance greater than 3.3 mm can indicate more than one missing tooth.

Next, at operation 406, the process includes renumbering the teeth based on the distance of the gap. For example, if the gap threshold is set to 3 mm, and the identified gap distance between adjacent teeth is 3.1 mm, then the teeth can be renumbered such that the tooth posterior to the gap accounts for the missing tooth. As described in step 404, a gap tooth threshold can also be defined to indicate more than one missing tooth. For example, a gap threshold of greater than 3.3 mm may indicate two missing teeth. In this example, the teeth can be renumbered to account for not one, but two missing teeth.

Figure 5:
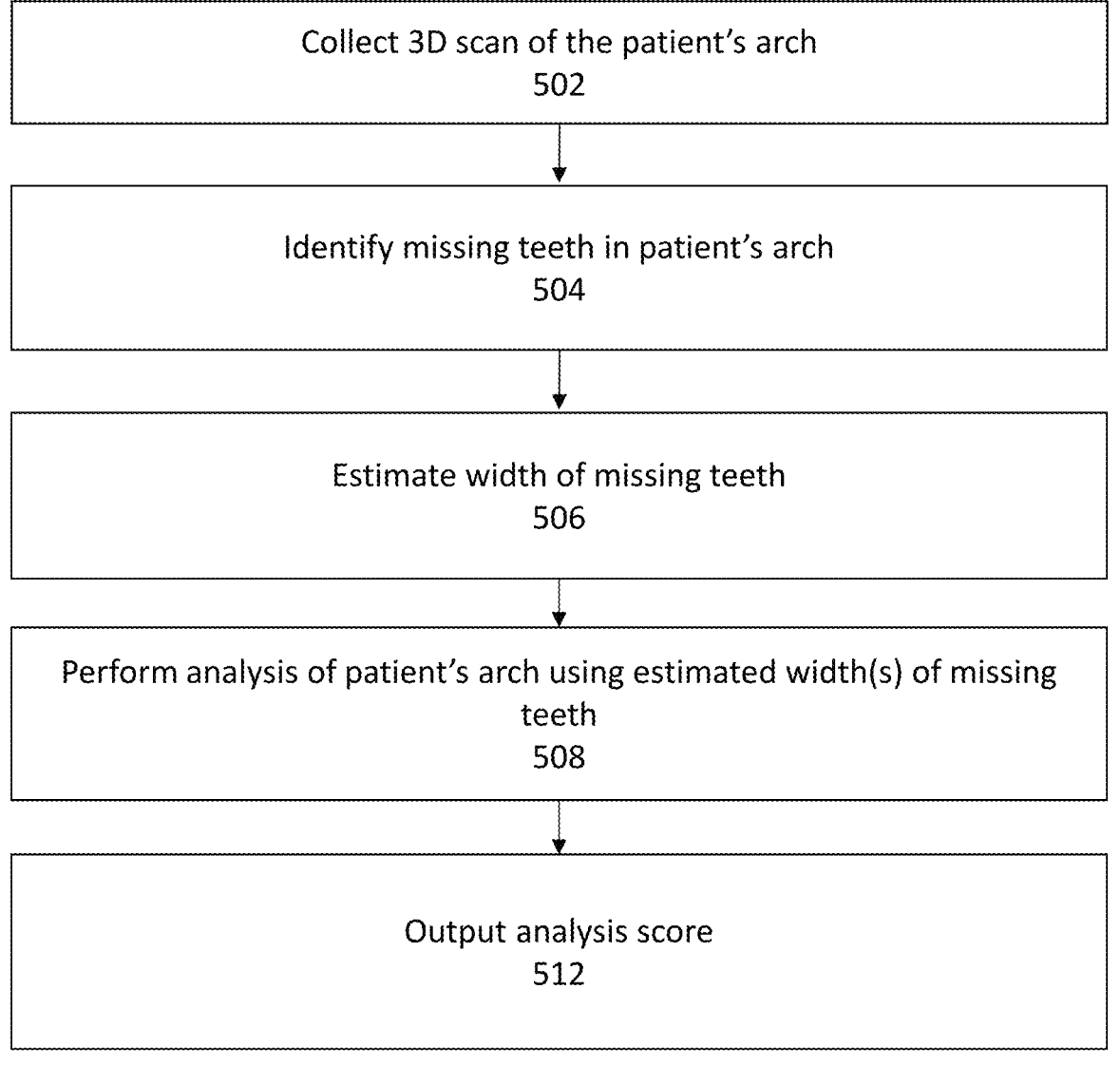
FIG. 5 illustrates a flowchart that describes a method for automatically performing an analysis for a patient's arches when the patient has one or more missing teeth.

FIG. 5 illustrates a flowchart 500 that describes a method for automatically performing an analysis (such as, but not limited to a Bolton analysis) for a patient's arches when the patient has one or more missing teeth. At an operation 502, the system may automatically collect a three-dimensional (3D) scan of the patient's dental arch. The 3D scan may be collected directly from the patient (e.g., using an intraoral scanner) or indirectly (e.g., by scanning a mold of the patient's dentition and/or be receiving a digital model of the patient taken by another, etc.).

Next, at an operation 504, the system may automatically identify missing teeth in the patient's arches. Missing teeth can be identified, for example, by identifying a gap between adjacent teeth that exceeds a gap threshold. The size of the gap may also be used to determine if more than one tooth is missing.

Figure 7:
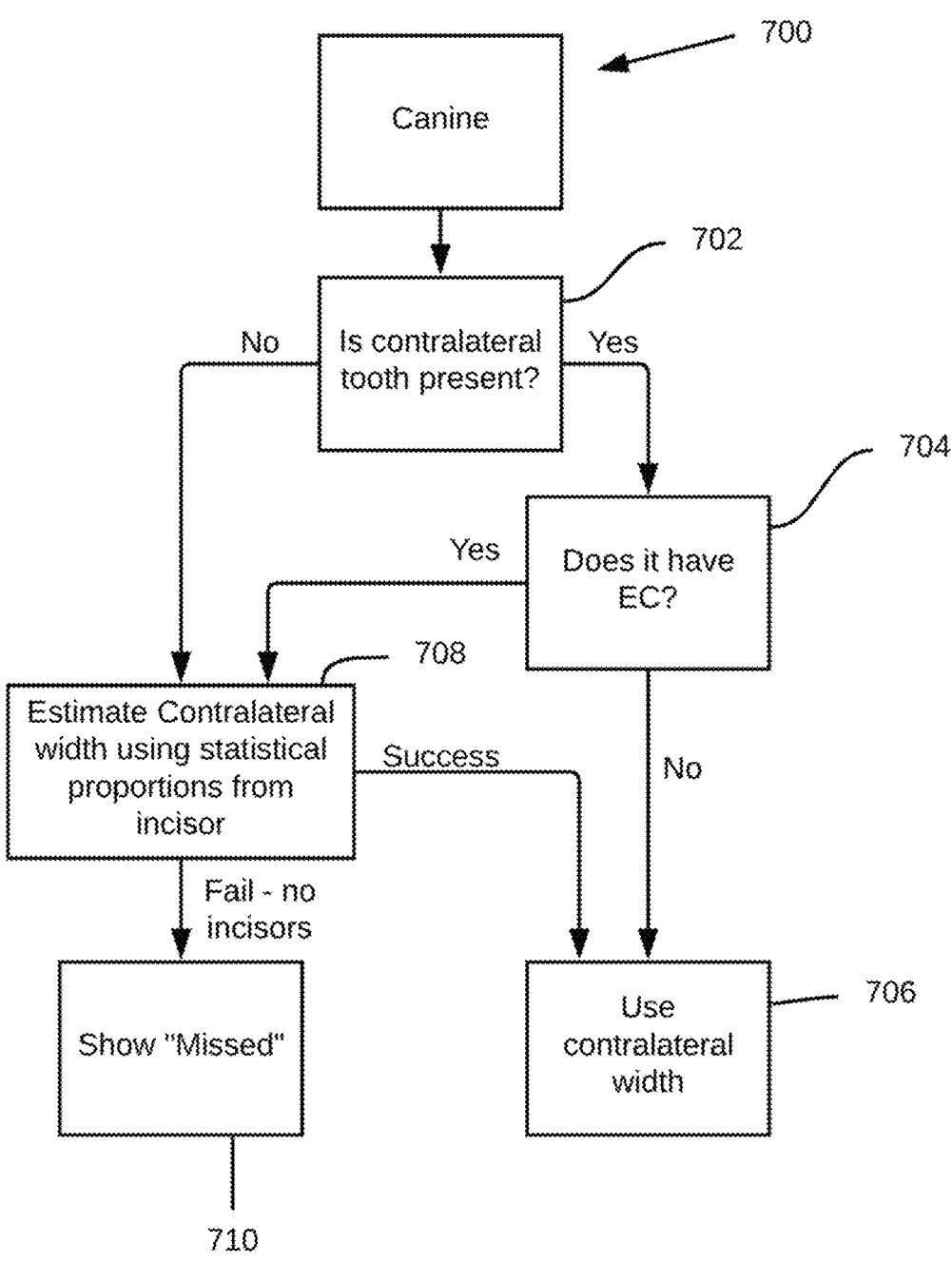
FIG. 7 illustrates a flowchart describing a method of estimating a width of a missing canine.
Figure 8:
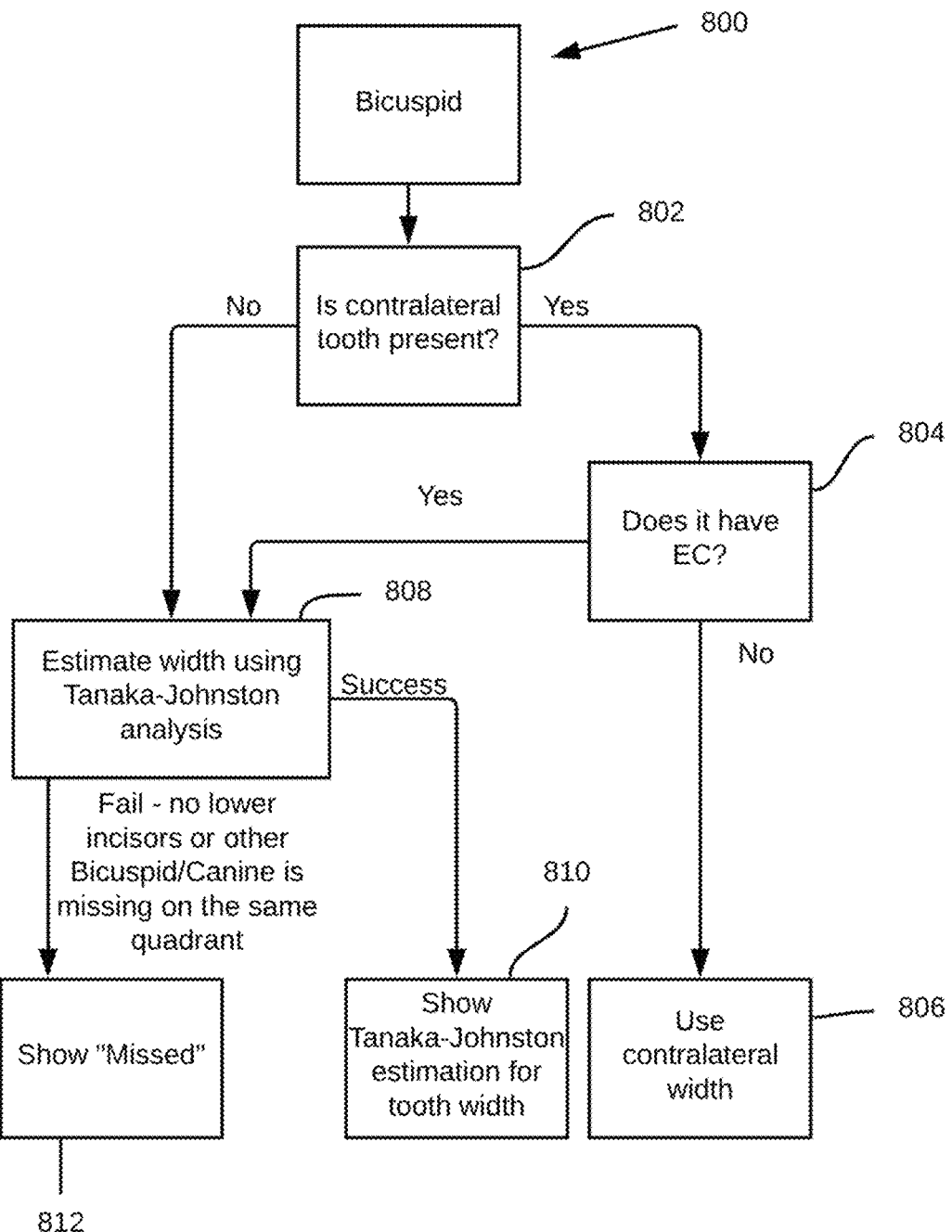
FIG. 8 illustrates a flowchart describing a method of estimating a width of a missing premolar.

Next, at an operation 506, the system may automatically estimate the width of missing teeth. As described above, the technique used to estimate or determine the width of the missing teeth depends on the type of tooth that is missing. Therefore, FIG. 6 illustrates a flowchart describing a method of estimating a width of a missing incisor, FIG. 7 illustrates a flowchart describing a method of estimating a width of a missing canine, and FIG. 8 illustrates a flowchart describing a method of estimating a width of a missing premolar.

After the tooth width has been estimated according to the tooth type (described in more detail below), at operation 508, the system can perform an analysis of the patient's arch using the estimated width(s) from operation 506. When the analysis is a Bolton analysis, the system may determine the ratio of the sum of some or all of the widths of the maxillary teeth to the widths of the mandibular teeth (including any missing teeth, whose dimensions may be estimated as described above). Finally, at operation 510, the system can output the analysis score (e.g., metric).

Figure 6:
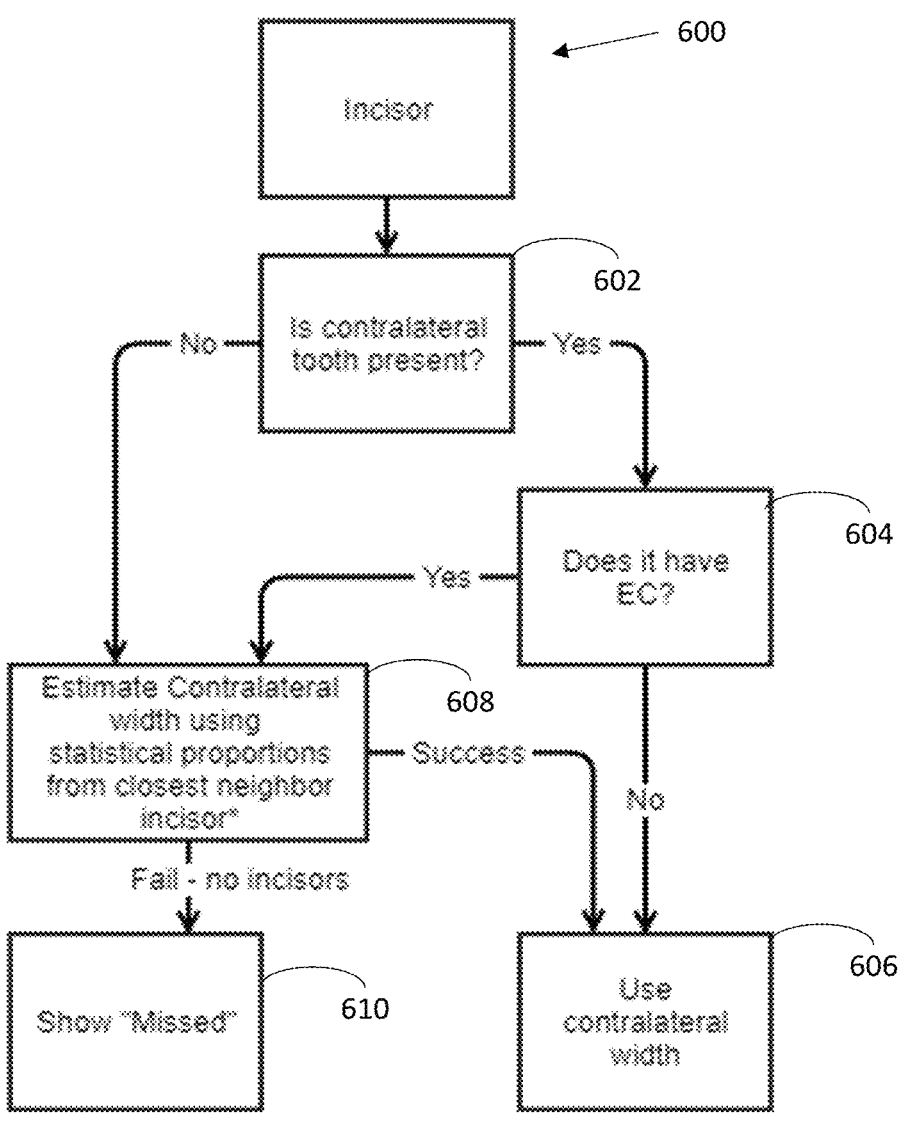
FIG. 6 illustrates a flowchart describing a method of estimating a width of a missing incisor.

FIG. 6 is a flowchart 600 describing a method of estimating a width of a missing incisor tooth in a patient's arch. First, at an operation 602, the system can determine if a contralateral incisor tooth is present. If a contralateral incisor tooth is present, then at operation 604 the system determines if the contralateral incisor tooth has an eruption compensation geometry (EC) present. An eruption compensation geometry allows aligners to accommodate erupting teeth using shapes (e.g., bubbles) that do not interfere with erupting teeth. Thus, the system can use information regarding erupting teeth, or can detect and identify erupting teeth as described above to determine if an EC is present. If no EC is present, then at operation 606 the system can use the contralateral incisor width as the estimated width for the missing incisor.

If the contralateral incisor is not present, or if it is present but has an EC, then at operation 608 the system can estimate the width of the missing tooth using statistical proportions from the closest neighbor incisor. As described above, central incisors differ in width from lateral incisors by a predetermined amount (e.g., +1.85 mm on the upper arch and −0.5 mm on the lower arch). This calculation can be used by the system to estimate the width of the missing tooth.

If the incisors needed to perform the estimate in operation 608 are missing from the patient's dental arch, the system can display an error or "missed" message at operation 610.

FIG. 7 is a flowchart 700 describing a method of estimating a width of a missing canine tooth in a patient's arch. First, at an operation 702, the system can determine if a contralateral canine tooth is present. If a contralateral canine tooth is present, then at operation 704 the system determines if the contralateral canine tooth has an eruption compensation geometry (EC) present. If no EC is present, then at operation 706 the system can use the contralateral canine width as the estimated width for the missing incisor.

If the contralateral canine is not present, or if it is present but has an EC, then at operation 708 the system can estimate the width of the missing tooth using statistical proportions from the incisors. As described above, canines differ in width from incisors by a predetermined amount (e.g., +2.4 mm on the upper arch and +1.5 mm on the lower arch). This calculation can be used by the system to estimate the width of the missing tooth. If the analysis is unsuccessful (e.g., the teeth required for the analysis are missing) then the system can output an error or "missed" message at operation 710.

FIG. 8 is a flowchart 800 describing a method of estimating a width of a missing bicuspid or premolar tooth in a patient's arch. First, at an operation 802, the system can determine if a contralateral canine tooth is present. If a contralateral canine tooth is present, then at operation 804 the system determines if the contralateral canine tooth has an eruption compensation geometry (EC) present. If no EC is present, then at operation 806 the system can use the contralateral canine width as the estimated width for the missing incisor.

If the contralateral bicuspid is not present, or if it is present but has an EC, then at operation 808 the system can estimate the width of the missing tooth using Tanaka-Johnston analysis. Tanaka-Johnston analysis for bicuspid teeth can be implemented using the relationships (e.g., shown as (3) and (4) above) which uses the widths of incisors and canines to determine or estimate the width of a bicuspid in the same quadrant. If the Tanaka-Johnston analysis is successful, the estimated width can be output at operation 810. If the analysis is unsuccessful (e.g., the teeth required for the analysis are missing or incomplete) then the system can output an error or "missed" message at operation 812.

Figure 9:
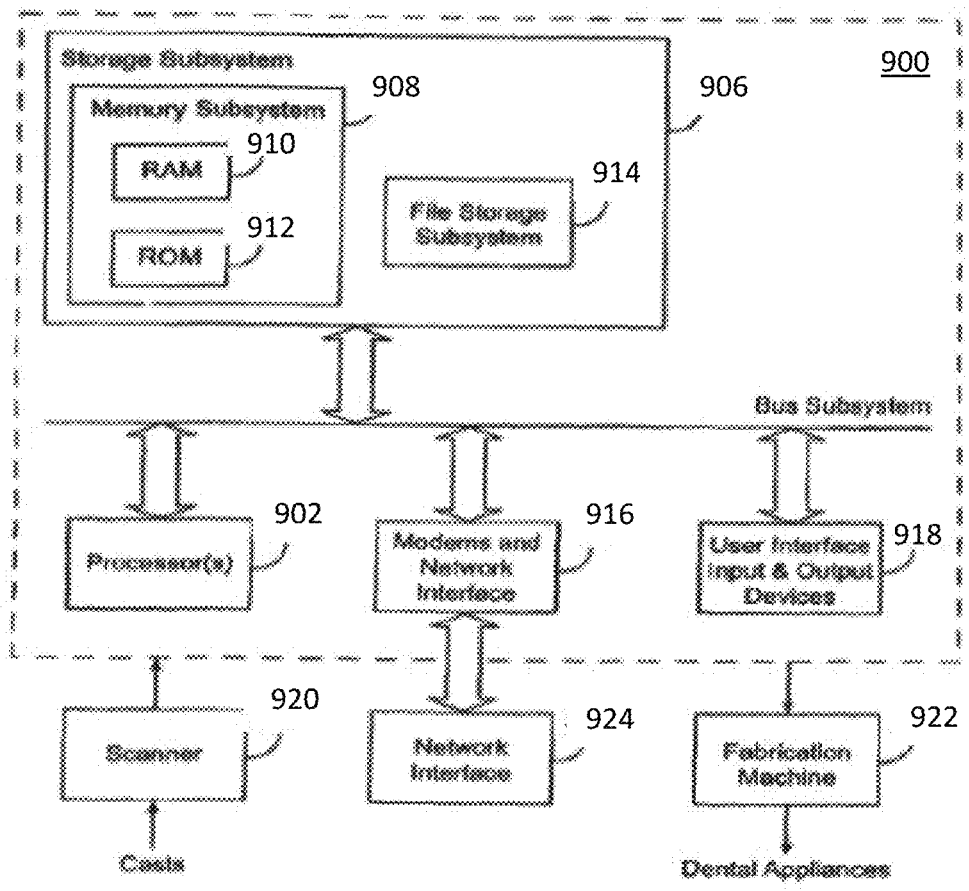
FIG. 9 is a simplified block diagram showing an example of a data processing system for designing and manufacturing an orthodontic aligner.

The methods described herein may be performed by an apparatus, such as a data processing system, which may include hardware, software, and/or firmware for performing many of these steps described above. For example, FIG. 9 is a simplified block diagram of a data processing system 900. Data processing system 900 typically includes at least one processor 902 which communicates with a number of peripheral devices over bus subsystem 904. These peripheral devices typically include a storage subsystem 906 (memory subsystem 908 and file storage subsystem 914), a set of user interface input and output devices 918, and an interface to outside networks 916, including the public switched telephone network. This interface is shown schematically as "Modems and Network Interface" block 916, and is coupled to corresponding interface devices in other data processing systems over communication network interface 924. Data processing system 900 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 906 maintains the basic programming and data constructs that provide the functionality of the present invention. The software modules discussed above are typically stored in storage subsystem 906. Storage subsystem 906 typically comprises memory subsystem 908 and file storage subsystem 914.

Memory subsystem 908 typically includes a number of memories including a main random access memory (RAM) 910 for storage of instructions and data during program execution and a read only memory (ROM) 912 in which fixed instructions are stored. In the case of Macintosh-compatible personal computers the ROM would include portions of the operating system; in the case of IBM-compatible personal computers, this would include the BIOS (basic input/output system).

File storage subsystem 914 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 904 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 920 is responsible for scanning casts of the patient's teeth obtained either from the patient or from an orthodontist and providing the scanned digital data set information to data processing system 900 for further processing. In a distributed environment, scanner 920 may be located at a remote location and communicate scanned digital data set information to data processing system 900 over network interface 924.

Fabrication machine 922 fabricates dental appliances based on intermediate and final data set information received from data processing system 900. In a distributed environment, fabrication machine 922 may be located at a remote location and receive data set information from data processing system 900 over network interface 924.

The dental appliance fabricated by the fabrication machine 922 can be designed to implement at least a portion of a treatment plan, comprising a shell having a plurality of cavities therein designed to receive teeth of a jaw.

In another embodiment, the system 900 of FIG. 9 can include a non-transitory computing device readable medium having instructions stored thereon that are executable by a processor to cause a computing device to receive, via a computing device, data representing a plurality of teeth and generate a series of incremental tooth arrangements to define a proposed orthodontic treatment.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving, in a processor, a scan of a patient's teeth;
identifying a missing tooth and an associated dental arch in the scan of the patient's teeth;
determining that a contralateral tooth to the missing tooth is not present;
estimating a mesiodistal width of the missing tooth, wherein the estimated mesiodistal width is based on the associated dental arch of the missing tooth and a predetermined offset added to a tooth width of a tooth next to the missing tooth that is not the contralateral tooth;
calculating a ratio of the mesiodistal widths of at least some of the patient's mandibular teeth to at least some of the patient's maxillary teeth, wherein the calculation of the mesiodistal width includes the estimated mesiodistal width of the missing tooth;
creating an orthodontic treatment plan to reposition at least one of the patient's teeth based on the calculated ratio; and
outputting the orthodontic treatment plan.

2. The method of claim 1, wherein identifying a missing tooth comprises:
automatically detecting a gap between adjacent teeth; and
determining, in the processor, that the detected gap exceeds a gap threshold.

3. The method of claim 2, wherein the gap threshold comprises a distance of at least 1 millimeter (mm), 2 mm, 3 mm, 4 mm, or 5 mm.

4. The method of claim 1, further comprising determining that the contralateral tooth has an eruption compensation (EC) geometry, and wherein creating the orthodontic treatment plan comprises using the EC geometry of the contralateral tooth to provide a shape in an aligner to accommodate an erupting tooth.

5. The method of claim 1, wherein the mesiodistal width of the missing tooth is based, at least in part, on statistical proportions of a neighboring tooth.

6. The method of claim 1, wherein the mesiodistal width of the missing tooth is estimated using Tanaka-Johnston analysis.

7. The method of claim 1, further comprising creating a dental appliance configured to reposition at least one tooth of the patient from the orthodontic treatment plan.

8. The method of claim 1, wherein the steps of identifying the missing tooth and estimating the mesiodistal width of the missing tooth is triggered by a user upon selection of a control to display relative sizes of the patient's teeth.

9. The method of claim 1, further comprising outputting the ratio, wherein outputting the ratio comprises displaying the ratio over a model of the patient's teeth based on the scan.

10. The method of claim 1, wherein calculating the ratio of mesiodistal widths includes determining a sum of the widths of the mandibular teeth divided by a sum of the widths of the maxillary teeth.

11. A method comprising:
receiving, in a processor, a scan of a patient's teeth;
displaying a model of the patient's teeth based on the scan;
triggering, upon selection by a user of a control to display a metric of relative sizes of the patient's teeth, a computing system to perform the method of:
identifying a missing tooth and an associated dental arch in the scan of the patient's teeth;
determining that a contralateral tooth to the missing tooth is not present;

estimating a mesiodistal width of the missing tooth, wherein the estimated mesiodistal width is based on the associated dental arch of the missing tooth and a predetermined offset added to a tooth width of a tooth next to the missing tooth that is not the contralateral tooth; and calculating a ratio of the mesiodistal widths of at least some of the patient's mandibular teeth to at least some of the patient's maxillary teeth, wherein the calculation of the mesiodistal width includes the estimated mesiodistal width of the missing tooth;

create an orthodontic treatment plan to reposition at least one of the patient's teeth based on the calculated ratio; and display the orthodontic treatment plan.

12. The method of claim 11, wherein triggering the processor to identify a missing tooth comprises:

automatically detect a gap between adjacent teeth; and determine, in the processor, that the detected gap exceeds a gap threshold.

13. The method of claim 11, wherein the mesiodistal width of the missing tooth is estimated based is based, at least in part, on statistical proportions of a neighboring tooth.

14. The method of claim 11, further comprising creating a dental appliance configured to reposition at least one tooth of the patient based on the orthodontic treatment plan.

15. A non-transitory computing device readable medium having instructions stored thereon that are executable by one or more processors to cause a computing system to perform the method of:

receiving, in the one or more processors, a scan of a patient's teeth;

identifying a missing tooth and an associated dental arch in the scan of the patient's teeth;

determining that a contralateral tooth to the missing tooth is not present;

estimating a mesiodistal width of the missing tooth, wherein the estimated mesiodistal width is based on the associated dental arch of the missing tooth and a predetermined offset added to a tooth width of a tooth next to the missing tooth that is not the contralateral tooth;

calculating a ratio of the mesiodistal widths of at least some of the patient's mandibular teeth to at least some of the patient's maxillary teeth, wherein the calculation of the mesiodistal width includes the estimated mesiodistal width of the missing tooth;

creating an orthodontic treatment plan to reposition at least one of the patient's teeth based on the calculated ratio; and outputting the orthodontic treatment plan.

16. The non-transitory computing device readable medium of claim 15, wherein identifying a missing tooth comprises:

automatically detecting a gap between adjacent teeth; and determining that the detected gap exceeds a gap threshold.

17. The non-transitory computing device readable medium of claim 15, wherein estimating the mesiodistal width of the missing tooth is based on statistical proportions of a neighboring tooth.

18. The non-transitory computing device readable medium of claim 15, further comprising determining that the contralateral tooth has an eruption compensation (EC) geometry, and wherein creating the orthodontic treatment plan comprises using the EC geometry of the contralateral tooth to provide a shape in an aligner to accommodate an erupting tooth.

19. The non-transitory computing device readable medium of claim 15, wherein identifying the missing tooth, estimating the mesiodistal width of the missing tooth and calculating the ratio of mesiodistal widths are triggered by a user upon selection of a control on a user interface.

20. The non-transitory computing device readable medium of claim 15, further comprising creating a dental appliance configured to reposition at least one tooth of the patient from the orthodontic treatment plan.

* * * * *